(12) United States Patent
Moreno et al.

(10) Patent No.: US 6,678,795 B1
(45) Date of Patent: Jan. 13, 2004

(54) METHOD AND APPARATUS FOR MEMORY PREFETCHING BASED ON INTRA-PAGE USAGE HISTORY

(75) Inventors: Jaime H. Moreno, Hartsdale, NY (US); Jude A. Rivers, Peekskill, NY (US); John-David Wellman, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/639,263

(22) Filed: Aug. 15, 2000

(51) Int. Cl.$^7$ ................................................ G06F 12/08
(52) U.S. Cl. ........................ 711/137; 711/158; 711/146; 711/213
(58) Field of Search .................................. 711/137, 146, 711/158, 128, 204, 213; 709/213, 217; 707/2

(56) References Cited

U.S. PATENT DOCUMENTS

| | | | | |
|---|---|---|---|---|
| 5,361,391 A | * | 11/1994 | Westberg | 711/137 |
| 5,537,573 A | * | 7/1996 | Ware et al. | 711/137 |
| 5,761,706 A | * | 6/1998 | Kessler et al. | 711/118 |
| 5,925,100 A | * | 7/1999 | Drewry et al. | 711/118 |
| 6,026,474 A | * | 2/2000 | Carter et al. | 711/121 |
| 6,134,643 A | * | 10/2000 | Kedem et al. | 711/137 |
| 6,173,392 B1 | * | 1/2001 | Shinozaki | 712/207 |
| 6,182,111 B1 | * | 1/2001 | Inohara et al. | 709/201 |
| 6,182,122 B1 | * | 1/2001 | Berstis | 709/203 |
| 6,233,645 B1 | * | 5/2001 | Chrysos et al. | 710/116 |
| 6,484,239 B1 | * | 11/2002 | Hill et al. | 711/137 |
| 6,549,896 B1 | * | 4/2003 | Candan et al. | 707/2 |
| 6,557,079 B1 | * | 4/2003 | Mason et al. | 711/137 |

OTHER PUBLICATIONS

Mukherjee et al., "Using Prediction to Accelerate Coherence Protocols", Proceedings of the 25$^{th}$ Annual International Symposium on Computer Architecture (ISCA), Barcelona, Spain, Jun. 27–Jul. 2, 1998, pp. 179–190.

* cited by examiner

*Primary Examiner*—Pierre-Michel Bataille
(74) *Attorney, Agent, or Firm*—F.Chau & Associates, LLP (57) ABSTRACT

There is provided a method for fetching at least one of instructions and operand data from a second memory into a first memory of a computer system having at least one processor. The method includes the step of storing a plurality of entries in a table associated with the first memory. Each entry is associated with a memory page that includes a plurality of storage elements in the second memory, and includes information of prior access by the at least one processor to each of the plurality of storage elements. Upon a miss to the first memory from the at least one processor based upon a request, the table is searched for a given entry associated with a given page that includes a target of the request. If the given entry is found, then at least one prefetch request is generated to fetch at least one storage element included in the given page from the second memory to the first memory, based upon given information comprised in the given entry.

34 Claims, 5 Drawing Sheets

Shifted addresses by 12 bits:
Implies there are 2^24 address-range buckets (if 36-bit addressing)
I read 57571923 trace records

| Index (D) | Index (X) | Accesses | MaskBits | Cache Line Accesses In Bucket | TouchByProcs |
|---|---|---|---|---|---|
| 0 | 0x00000000 | 17242 | 0x030d0cc0 | ..11.....11..11......11.11......11....1 | 0123456789ab |
| 3 | 0x00000003 | 1231196 | 0x0000018e | .................................1111. | 0123456789ab |
| 4 | 0x00000004 | 139947 | 0x00000607 | ...........................11....111... | 0123456789ab |
| 9 | 0x00000009 | 75563 | 0x000000f8 | ...................................1111 | 0123456789ab |
| 11 | 0x0000000b | 2737 | 0x00000001 | .......................................1 | 0123456789ab |
| 440 | 0x000001b8 | 38791 | 0xc7fe1f80 | 11....111111111111....111111111 | 0123456789ab |
| 441 | 0x000001b9 | 31427 | 0xfdfe3ff3 | 1111.11111111111.1111111111..11 | 0123456789ab |
| 442 | 0x000001ba | 208886 | 0xff3fff9ff | 11111111..1111111111111.1111111 | 0123456789ab |
| 443 | 0x000001bb | 48868 | 0xfffc7fe0 | 111111111111111.11111111111 | 0123456789ab |
| 444 | 0x000001bc | 18964 | 0xffe00003 | 1111111111111111111...........11 | 0123456789ab |
| 183917 | 0x0002ce6d | 6 | 0x00000001 | .......................................1 | 0 c |
| 183918 | 0x0002ce6e | 24 | 0x000007f7 | .....................................111.111 | 56 a c |
| 183919 | 0x0002ce6f | 4 | 0x00000001 | .......................................1 | 0 c |
| 183965 | 0x0002ce9d | 32 | 0x07000000 | .........11111 | 012 45 789 |
| 183994 | 0x0002ceba | 687 | 0x07000000 | .........111 | 0 |
| 184699 | 0x0002d17b | 1 | 0x00000001 | .......................................1 | 2 6 8 |
| 184747 | 0x0002d1ab | 804 | 0x9fffbff | 1..11111111111111.111111111111 | 3 |
| 184772 | 0x0002d1c4 | 3 | 0x00030000 | ................11 | 2 789 |
| 184789 | 0x0002d1d5 | 10 | 0x00000003 | ..............................11 | |
| 1502531 | 0x0016ed43 | 3 | 0x00000003 | ..............................11 | 7 |
| 1502551 | 0x0016ed57 | 646 | 0xffffffff | 11111111111111111111111111111111 | 0 234 789 b |
| 1502654 | 0x0016edbe | 2731 | 0xfffffe00 | 1111111111111111111111111 | 1 4 9a |
| 1502688 | 0x0016ede0 | 2 | 0x00001800 | ....................11 | 2 |

METHOD AND APPARATUS FOR MEMORY PREFETCHING BASED ON INTRA-PAGE USAGE HISTORY

BACKGROUND

1. Technical Field

The present invention relates generally to memories in computer processing systems and, in particular, to a method and apparatus for memory prefetching based on intra-page usage history.

2. Background Description

With respect to prefetching based on history, the prior art corresponding thereto uses history information to predict the next possible cache line that a processor may access. Some of the prior art is based on parameters like stride distance, i.e., the distance between two consecutive accesses; in this case, the prediction engine adds or subtracts the stride distance to the current address with the anticipation that the processor will request the resulting address. Other approaches predict the next possible address based on some trend seen earlier in other regions of memory. Yet others, like the Cosmos coherence message predictor, predict the source and type of coherence message for a cache line in a multiprocessor (MP) system using a complex prediction logic. The goal of the Cosmos predictor is to predict incoming messages that affect memory blocks and execute those messages in time. The Cosmos predictor is described by Hill et al., in "Using Prediction to Accelerate Coherence Protocols, Proceedings of the 25th Annual International Symposium on Computer Architecture (ISCA), Barcelona, Spain, Jun. 27 through Jul. 2, 1998, pp. 179–90. Generally, most prior art approaches are proposed with time critical operations in mind, where a misprediction can be expensive in both clock cycles and bus saturation. However, most of these approaches suffer from a long learning time overhead which is necessary for improved prediction accuracy.

Accordingly, it would be desirable and highly advantageous to have a method and apparatus for memory prefetching which does not suffer from a long learning time overhead and which is capable of delivering multiple data and/or instruction objects well before such objects are actually used.

SUMMARY OF THE INVENTION

The problems stated above, as well as other related problems of the prior art, are solved by the present invention, a method and apparatus for memory prefetching based on intra-page usage history. The invention employs data-centric techniques to reduce data/instruction misses in cache memories in a computer processing system. The invention is based upon a mechanism for data/instruction prefetching which, in turn, is based upon prior intra-page usage. The concept is to monitor and keep a history of which cache lines (data/instructions) within a page are used, and attempt to pull multiple cache lines when the previous usage of a page appears to repeat. Cache lines may be pulled directly from main memory or from higher level caches, and even from other nodes/processors in the case of a multiprocessor (MP) system when the cache lines are resident there.

As noted above, the prior art in memory prefetching based on history has mostly been limited to the prediction and prefetching of the next possible sequential cache line(s) after a cache miss, or multiple cache lines that are identified by a sequential pattern. In contrast, the invention may prefetch arbitrary lines within a page which do not need to exhibit any pattern, only history that they have been used in the past.

Moreover, the invention may use only one previous instance of a page being accessed (rather than two or more, as required by stride-based approaches of the prior art). Thus, the invention has a minimal initial learning overhead with respect to the prior art. Also, the invention employs filtering of prefetch requests, which aids in removing redundant and useless prefetches so as to avoid excessive prefetch bus traffic.

According to a first aspect of the invention, there is provided a method for fetching at least one of instructions and operand data from a second memory into a first memory of a computer system having at least one processor. The method includes the step of storing a plurality of entries in a table associated with the first memory, wherein each entry is associated with a memory page that includes a plurality of storage elements in the second memory, and includes information of prior access by the at least one processor to each of the plurality of storage elements. Upon a miss to the first memory from the at least one processor based upon a request, the table is searched for a given entry associated with a given page that includes a target of the request. If the given entry is found, then at least one prefetch request is generated to fetch at least one storage element included in the given page from the second memory to the first memory, based upon given information comprised in the given entry. Prior to satisfying the at least one prefetch request, the at least one prefetch request is analyzed with respect to other prefetch requests and fetch requests, if any, to determine which of the at least one prefetch request and the other prefetch requests are to be satisfied.

According to a second aspect of the invention, the method further includes the step of satisfying at least some of the at least one prefetch request and the other prefetch requests, based on a result of the analyzing step.

According to a third aspect of the invention, upon a hit to the first memory from the at least one processor based upon the request, the table is searched for a particular entry corresponding to a particular page that includes the target of the request. If the particular entry is found, particular information included in the particular entry is updated with usage information relative to any particular storage elements that contain the target.

According to a fourth aspect of the invention, the method further includes the step of creating a new entry for the given page, if the given entry is not found.

According to a fifth aspect of the invention, the creating step includes the step of flagging any given storage elements in the given page that contain the target.

According to a sixth aspect of the invention, the flagging step includes the step of setting a bit corresponding to each of the given storage elements to a predefined value.

According to a seventh aspect of the invention, the analyzing step includes the step of identifying any redundant prefetch and fetch requests from among the at least one prefetch request, the other prefetch requests, and the fetch requests.

According to an eighth aspect of the invention, the analyzing step includes the step of prioritizing an order of the at least one prefetch request, the other prefetch requests, and the fetch requests with respect to other operations being handled by the second memory.

According to a ninth aspect of the invention, the generating step further includes the step of limiting how many prefetch requests are at least one of generated and issued, based upon predefined criteria.

According to a tenth aspect of the invention, the limiting step includes the step of constraining the generating step to generate the at least one prefetch request only if a target of the at least one prefetch request has been previously stored in the second memory.

According to an eleventh aspect of the invention, the limiting step includes the step of issuing the at least one prefetch request only if a target of the at least one prefetch request has been previously stored in the second memory.

According to a twelfth aspect of the invention, the method further includes the step of indicating whether a particular storage element has been previously stored in the second memory, based on a value associated with a particular bit in the table corresponding to the particular storage element.

According to a thirteenth aspect of the invention, the limiting step includes the step of maintaining a count of storage elements that are mapped to the given entry in the table and are currently present in the second memory.

According to a fourteenth aspect of the invention, the method further includes the step of incrementing the count for the given entry, upon the miss.

According to a fifteenth aspect of the invention, the method further includes the step of decrementing the count for the given entry, when a given storage element included in the given entry is evicted from the given entry.

According to a sixteenth aspect of the invention, the method further includes the step of determining a confidence value for the at least one prefetch request.

According to a seventeenth aspect of the invention, the determining step includes the step of reporting whether the at least one prefetch request was at least one of accessed, used and canceled.

According to an eighteenth aspect of the invention, the limiting step includes the step of constraining the generating step to generate the at least one prefetch request only if a target of the at least one prefetch request has a prefetch use measure greater than a predefined threshold.

These and other aspects, features and advantages of the present invention will become apparent from the following detailed description of preferred embodiments, which is to be read in connection with the accompanying drawings.

BRIEF DESCRIPTION OF THE DRAWINGS

FIG. 1 is a diagram illustrating a snapshot of a memory address trace grouped into pages, according to an illustrative embodiment of the invention;

DETAILED DESCRIPTION OF PREFERRED EMBODIMENTS

The present invention is directed to a method and apparatus for memory prefetching based on intra-page usage history. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 5.

The invention is a data-centric technique that reduces the data/instruction access latency in modern computer processing systems. The invention considers the full memory space in terms of blocks of physically contiguous memory. In current virtual memory systems, this corresponds well to a memory page and, thus, the term "page" is used herein to refer to any such guaranteed contiguous segment of physical memory to which the invention is applied.

The invention leverages intra-page instruction and data locality to generate prefetch requests into a local cache (or memory) from a distant cache (or memory). The prefetch requests are determined by keeping a per-page usage mask (PUM) at the local cache (or memory) controller, and using this mask to generate prefetch requests at an appropriate time. Each PUM entry records the set of sub-page entities within the page (usually called cache lines) that were accessed during an earlier usage of the page. It is to be appreciated that the invention may be implemented with respect to prefetching one or more cache lines, fractions of a cache line, or any variation thereof, as readily contemplated by one of ordinary skill in the related art.

As used herein, the term "pre-fetching" corresponds to the art of issuing a request ahead of time for a target instruction (s) and/or data in anticipation that the target instruction(s) and/or data will be needed by a processor in due course. Thus, a prefetch instruction allows for the target to be obtained and possibly cached, if the target is not already resident in a cache, in anticipation of a demand fetch instruction. Prefetching is to be contrasted with "demand fetching" or simply "fetching", which corresponds to obtaining the target of a fetch instruction in response to a demand by a processor for the target. A target of a pre-fetch or fetch may be an instruction(s) and/or operand data.

FIG. 1 is a diagram illustrating a snapshot of a memory address trace grouped into pages, according to an illustrative embodiment of the invention. The trace indicates those lines in the pages that are accessed by a processor, and the number of times each particular page is accessed. FIG. 1 serves as a strong basis for the invention, especially for the use of PUM entries to drive the unique cache lines that are prefetched from the distant memory. The number of page accesses is determined by counting the total number of accesses to a memory location that falls within the page. In FIG. 1, each page is 4 kilobytes, and the local memory (L1) line size is fixed at 128 bytes. In this illustrative example, a single bit per cache line has been elected to gather the PUM data. Thus, a 32-bit entry is used to represent the 32 cache lines in a page. As shown in FIG. 1, the page with index 3 was accessed 123,196 times, but only five different cache lines were accessed. If it is presumed that these five unique cache lines are all used during each of the page's tours through the cache, the number of cache misses can potentially be cut by as much as 80% through aggressive prefetching.

In some embodiments of the invention, hardware is added to the local-memory controller to monitor cache misses. Such an embodiment is described with respect to FIG. 2 below. However, it is to be appreciated that in computer processing systems which employ a software-managed local memory or cache, the invention could be implemented without adding additional hardware to monitor the cache misses. Instead, code (software) may be added to the software-based cache miss handling code to handle the monitoring. Given the teachings of the invention provided herein, one of ordinary skill in the related art will readily contemplate these and other variations of the invention, while maintaining the spirit and scope thereof.

Figure 2:
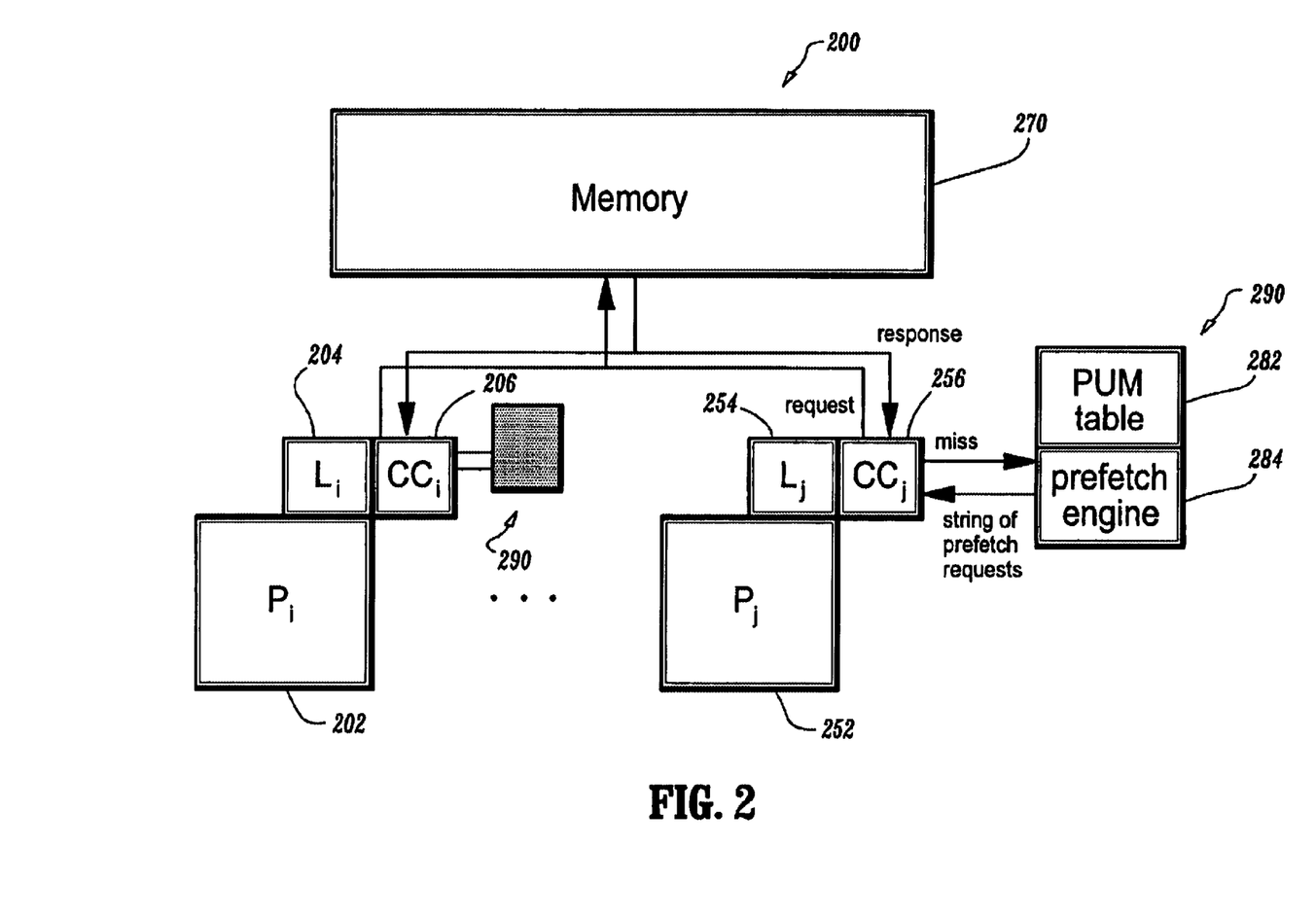
FIG. 2 is a diagram illustrating a multiprocessor computer system having a cache controller (CC) according to an illustrative embodiment of the invention.

FIG. 2 is a diagram illustrating a multiprocessor computer system 200 having a cache controller (CC), according to an illustrative embodiment of the invention. It is to be appreciated that the invention is not dependent on any particular computer processing architecture and, thus, while the cache controller is shown in a multiprocessor environment, other types of computer systems may also be used in accordance with the invention (e.g., uniprocessor systems). In the multiprocessor system 200, each of the various nodes/processors (e.g. Pi 202 and Pj 252) has its own local cache memory (e.g., Li 204, Lj 254, respectively) which interfaces with that of other nodes/processors and the main memory through an intervening medium (e.g., a bus, a ring, and so forth). For illustrative purposes, the invention is described in detail with respect to processor Pj 252 and its accompanying local cache Lj 254. Blocks CCi 206 and CCj 256 represent the cache controllers for the Li 204 and Lj 254 local caches, respectively. With respect to processor Pj 252, the local memory is the Lj cache 254, and the distant memory is, e.g., main memory 270

The invention employs a PUM table 282 and a prefetch engine 284 (also collectively referred to herein as PUM engine 290) at the local cache controller. The PUM table 282 maintains PUM entries, which are cache line usage patterns for individual pages. Each PUM entry records the local cache line usage history for a page of memory. A bit value of zero indicates that the corresponding cache line has not been used, whereas a bit value of 1 indicates that the line was used. The mechanisms for setting the value of this bit are described below. Note that the PUM table structure needs to be large enough to ensure history availability whilst being insignificant in overall local memory space. Intuitively, the size of the PUM table should have enough space to contain as many pages as the number of unique pages present in the cache. Given the teachings of the invention provided herein, one of ordinary skill in the related art will readily contemplate a proper size for the PUM table structure given the computer processing system in which in the invention is to be implemented.

Figure 3:
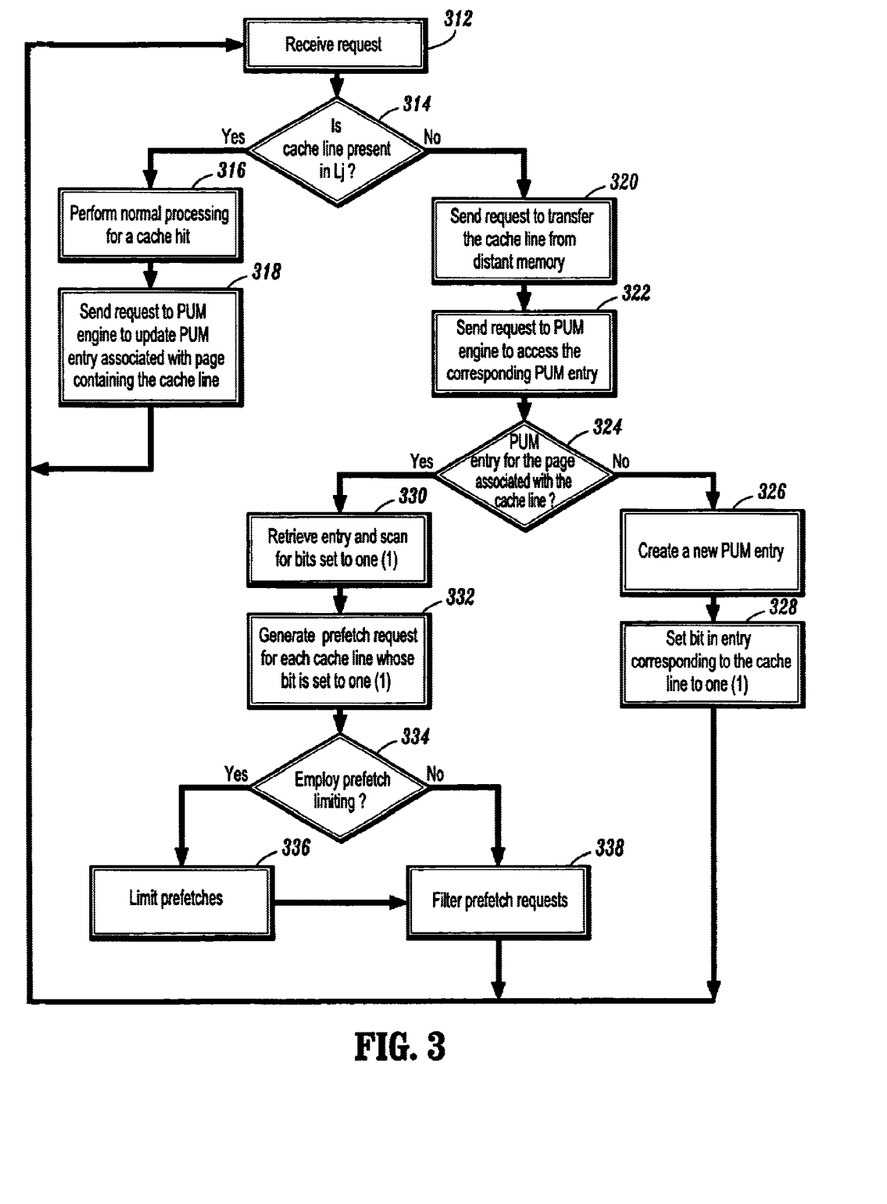
FIG. 3 is a flow diagram illustrating a method for memory prefetching, according to an illustrative embodiment of the invention.

FIG. 3 is a flow diagram illustrating a method for memory prefetching, according to an illustrative embodiment of the invention. The method summarily illustrates the functionality of the local cache controller CCj 256 and the attached PUM table 282 and prefetch engine 284.

A request is received by the cache controller CCj 256 (step 312). It is then determined whether the appropriate cache line is present in the local cache Lj 254 (i.e., is there a cache hit) (step 314). Such determination may be made using mechanisms/methods known by one of ordinary skill in the related art (e.g., mechanisms/methods for keeping a directory of cache contents).

If the cache line is present in the local cache Lj 254 (i.e., there is a cache hit), then the cache controller CCj 256 performs the normal processing for an access that hits in the ache (step 316), sends a request to the PUM engine 290 to update the information in the PUM entry associated with the page containing the line accessed (step 318), and returns to step 312. Preferably, steps 316 and 318 are performed concurrently. Optionally, prior to the return to step 312, the PUM engine 290 may optionally carry out operations as performed at steps 332 and 334 described below. Given the teachings of the invention provided herein, one of ordinary skill in the related art will readily contemplate these and other variations of the invention, while maintaining the spirit and scope thereof.

If, at step 314, it is determined that the cache line is not present in the local cache Lj 254 (i.e., there is a cache miss), then the cache controller CCj 256 sends a request to transfer the missing cache line from the distant memory (i.e., the CCj 256 generates a demand fetch to the distant memory) (step 320), and also sends a request to the PUM engine 290 for the PUM engine to access the corresponding PUM entry (step 322).

It is then determined whether there is a PUM entry in the PUM table 282 for the page associated with the requested cache line (step 324). If there is no such entry, then a new PUM entry is created within the PUM table to accumulate usage information for that page (step 326), the bit in the entry corresponding to the requested cache line is set to 1 to indicate that such line was accessed (step 328), and the method returns to step 312. No prefetch requests are generated for a newly created PUM entry. The new PUM entry displaces an existing PUM entry, using a similar allocation mechanism as the one used by the cache controller CCj 256 to allocate in the local cache Lj 254 the new line being fetched from the distant memory 270.

In contrast, if it is determined that there is such an entry at step 324, then the PUM engine 290 retrieves that entry and scans the entry for bits that are set to 1, which indicate previously accessed cache lines within the page (step 330). For each cache line whose bit is set to 1 in the PUM entry, the PUM engine generates a prefetch request and sends it to the cache controller CCj 256 (step 332). In addition, the bit in the PUM entry associated with the missing cache line is set to 1 (step 334). For example, in the case shown in FIG. 1, the PUM entry for the page with index 3 indicates that five cache lines were accessed during previous visits to that page of memory. This is represented by five bits in the PUN set to 1. Consequently, the PUN engine generates a prefetch request for each of the cache lines whose bit is set to 1 (at step 332).

It is then determined whether to employ prefetch limiting (step 334). This determination may be based upon may factors, as are readily apparent to one of ordinary skill in the related art. Moreover, methods in which to implement such a determination in a computer processing system are readily ascertainable by one of ordinary skill in the related art and are, thus, not further described herein.

If prefetch limiting is to be employed, then the PUM engine 290 limits the number of prefetch requests by applying various conditions to the prefetches generated, prior to sending the prefetch requests to the cache controller CCj 256 (step 336). Such limiting is described in further detail at the conclusion of the description of FIG. 2.

If prefetch limiting is not to be employed, then step 336 is bypassed and the method proceeds to step 338. At step 338, the cache controller CCj 256 filters the set of prefetch requests generated by the PUM engine 290, to remove any redundant requests (e.g., requests for cache lines that are already in the local cache 254), and to prioritize the order of prefetch requests with respect to other cache traffic (potentially discarding prefetch requests when there are too many outstanding demand requests or too many prefetch requests generated). The method then returns to step 312.

A more detailed description of limiting prefetches as specified by step 336 will now be given. As an example of such limiting, the PUM engine 290 could generate prefetch requests only when the access in the PUM table 282 is to a PUM entry that has already been accessed by the cache controller Lj 254 (i.e., the PUM entry is already marked as accessed). This has the effect of limiting the PUM engine's 290 prefetch request generation to situations where previously cached data is being refetched into the local cache 254, where the prefetches are more likely to be useful. This option requires an additional bit per PUM entry to indicate whether the entry has been previously accessed or not. This bit is set to 0 when the PUM entry is created, and is set to 1 when the PUM entry is accessed with a reference to a line whose corresponding bit in the PUM entry is set to 1 (e.g., the line has been previously accessed).

Another potential embodiment to limit the number of prefetches generated by the PUM engine (at step 336) is to keep a "presence counter" with each PUM entry. A presence counter is simply a counter that records the number of cache lines mapped to the PUM entry that are currently present in the local cache Lj 254. When the cache controller CCj 256 generates a demand miss, it notifies the PUM engine 290 that the requested cache line will be brought into the local cache Lj 254, and the PUM engine 290 increments the presence counter for the associated PUM entry. When a cache line is evicted from the local cache Lj 254, the cache controller CCj 256 notifies the PUM engine 290. If the PUM engine 290 finds a PUM entry for that cache line, then the presence counter is decremented. The presence counter can then be used to control when the PUM engine 290 will generate prefetches. For example, one extreme approach, which should produce a minimum number of prefetches, is to generate prefetches for a PUM entry only when the presence counter value goes from 0 to 1, i.e. the first miss to a page that is not a compulsory miss.

Figure 4:
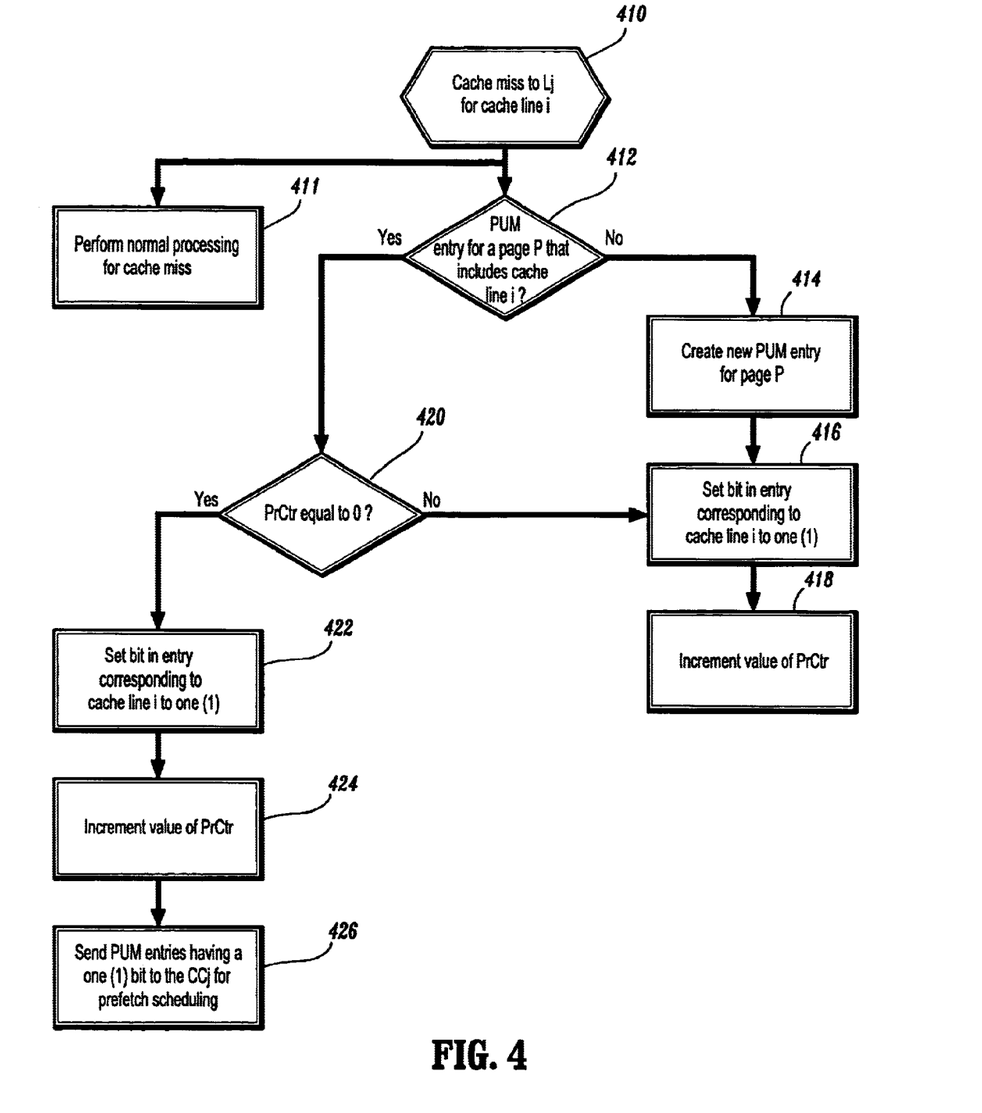
FIG. 4 is a flow diagram illustrating a method for setting and managing a presence counter, according to an illustrative embodiment of the invention.
Figure 5:
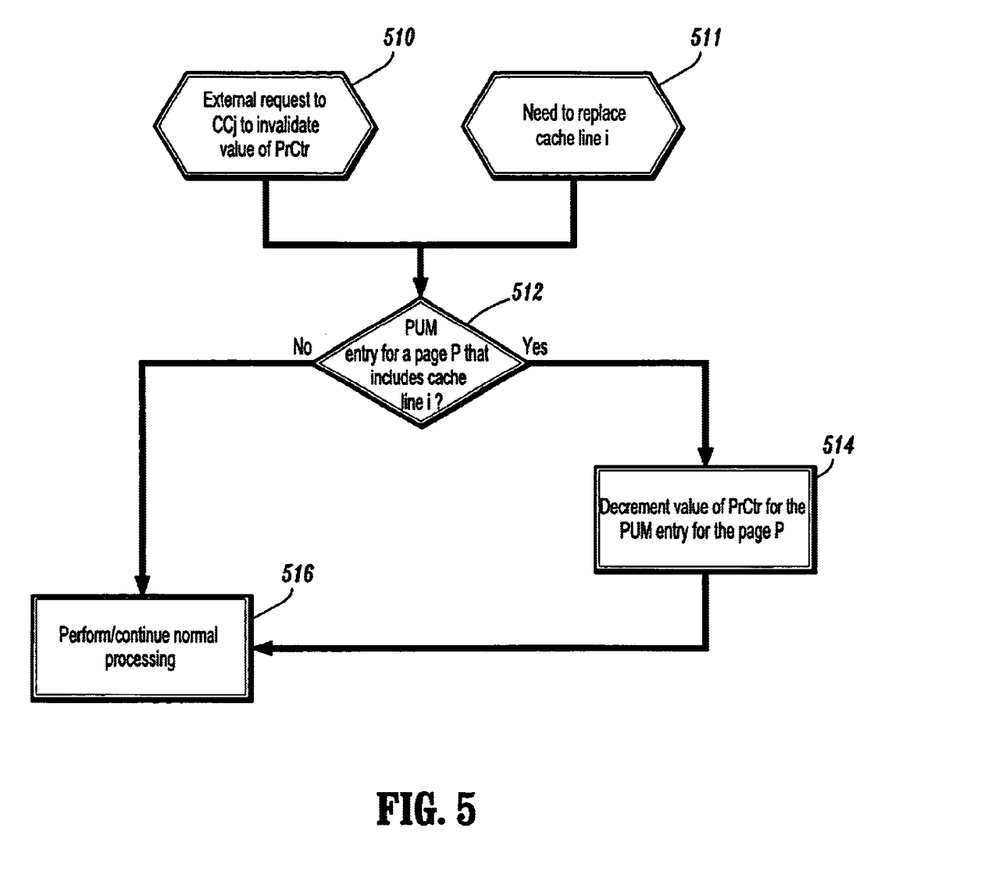
FIG. 5 is a flow diagram illustrating a method for updating the presence counter value, according to an illustrative embodiment of the invention.

Methods for managing and updating memory prefetching according to the invention are shown in FIGS. 4 and 5, respectively. Such methods employ a presence counter. However, it is to be appreciated that the invention is not limited to the methods of FIGS. 4 and 5 or the use of a presence counter with respect to managing and updating memory prefetching and, thus, other methods may be used. Given the teachings of the invention provided herein, one of ordinary skill in the related art will contemplate these and various other methods for managing and updating memory prefetching according to the invention, while maintaining the spirit and scope thereof.

FIG. 4 is a flow diagram illustrating a method for setting and managing the presence counter, according to an illustrative embodiment of the invention. Upon a miss to local cache Lj 254 for a cache line i (410), the cache controller CCj performs normal demand miss processing (step 411) and it is also determined whether there is a PUM entry for the page P that includes the cache line i (step 412). If there is no such PUM entry, then a new PUM entry is created within the PUM table to accumulate usage information for that page (step 414), the bit in the entry corresponding to the requested cache line is set to 1 to indicate that such line was accessed (step 416), and the value of the presence counter PrCtr is incremented (step 418). In contrast, if it determined at step 412 that a PUM entry exists for the cache line I, then it is further determined whether the value of the PrCtr is equal to zero (step 420). If not, then the method repeats steps 416 and 418. Otherwise, the bit in the entry corresponding to the requested cache line is set to 1 to indicate that such line was accessed (step 422), the value of the presence counter PrCtr is incremented (step 424), and the PUM entries having a one bit are sent to the cache controller CCj 516 for prefetch scheduling (step 426).

FIG. 5 is a flow diagram illustrating a method for updating the presence counter value, according to an illustrative embodiment of the invention. Upon an external request to cache controller CCj 256 to invalidate a cache line i (510) or a need to replace the cache line i (511), it is determined whether there is a PUM entry for the page P that includes the cache line i (step 512). If not, then the method proceeds to step 516. Otherwise, the value of the presence counter (PrCtr) for the PUM entry for the page P is decremented (step 514), and the method proceeds to step 516. At step 516, normal processing is performed/continued.

The illustrative embodiment of the invention described herein uses a single bit per cache line to gather the PUM data. Although a single accessed bit is sufficient for implementing the invention, one of ordinary skill in the related art will realize that it may be possible to achieve additional benefits, or to implement other limiting mechanisms, by employing more than a single bit per cache line in the PUM entries. Such additional bits could be used in various ways, including a mechanism to provide confidence for the prefetch (as is currently done for the case of branch prediction mechanisms in a processor). For example, for each prefetch request the cache controller could later report to the PUM engine whether that prefetch was used or canceled. A multi-bit value (e.g., a code) could then be used to record not only which cache lines were accessed, but also whether the prefetches generated for that cache line were subsequently used or canceled by the cache controller. The PUM engine could then limit the generation of prefetches to those cache lines in the PUM entry that have a sufficiently high prefetch use measure, implying that they are generally effective. This could be implemented as a simple saturating counter/decrementer, where a use of a prefetch increments the cache line's access value, and a canceled prefetch decrements the access value. The PUM engine can then generate prefetches only for those cache lines whose access value exceeds a specified threshold. Given the teachings of the invention provided herein, one of ordinary skill in the related art will contemplate these and various other multi-bit implementations for gathering the PUM data, while maintaining the spirit and scope of the invention.

It is to be appreciated that some of the many novel aspects of the invention over the prior art stem from the type of history information, the granularity/scope of data objects, and the level of the cache memory hierarchy considered by the invention. The invention focuses mainly on the higher levels of cache memory where access latency can be of loose concern, and consequently are also the availability of free cycles and bus time for completing non-critical operations. If the processor were to find every object (data/instruction) at a particular level without having to go all the way to memory or to other higher level caches in a MP environment, this can substantially impact the general system performance since a cache miss at this level can be costly. The invention described herein employs a simple prediction scheme that is capable of looking at a wide scope of physical memory (a whole page), and deciding what specific cache lines to pull into the cache. This is a data-centric approach that actively and aggressively moves data closer to the processor. There is minimal learning overhead associated with this scheme since all that is required at a minimum is for a page to have been used earlier by a processor.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An apparatus for fetching at least one of instructions and operand data from a second memory into a first memory of a computer system having at least one processor, the apparatus comprising:
   a table, associated with the first memory, adapted to store a plurality of entries, wherein each entry is associated with a memory page that includes a plurality of storage elements in the second memory, and comprises information of prior access by the at least one processor to each of the plurality of storage elements;
   an engine, associated with the first memory, adapted to search the table for a given entry associated with a given page that includes a target of a request, and to generate at least one prefetch request to fetch at least one storage element included in the given page from the second memory to the first memory based upon given information comprised in the given entry if the given entry is found, the request corresponding to a miss to the first memory from the at least one processor;
   a controller, associated with the first memory, adapted to analyze the at least one prefetch request with respect to other prefetch requests and fetch requests, if any, to determine which of the at least one prefetch request and the other prefetch requests are to be satisfied, prior to satisfying the at least one prefetch request,
   wherein the apparatus prefetches arbitrary lines within the given page based upon prior access information of the given page, wherein said controller is further adapted to prioritize an order of the at least one prefetch request the other prefetch requests, and the fetch requests with respect to other operations being handled by the second memory.

2. The apparatus according to claim 1, wherein said controller is further adapted to satisfy at least one of the at least one prefetch request and the other prefetch requests, based upon an analysis result.

3. The apparatus according to claim 1, wherein said engine is further adapted to search the table for a particular entry corresponding to a particular page that includes the target of the request and to update particular information comprised in the particular entry with usage information relative to any particular storage elements that contain the target if the particular entry is found, upon a hit to the first memory from the at least one processor based upon the request.

4. The apparatus according to claim 1, wherein said engine is further adapted to create a new entry for the given page, if the given entry is not found.

5. The apparatus according to claim 4, wherein said engine is further adapted to flag any given storage elements in the new entry for the given page that contain the target.

6. The apparatus according to claim 1, wherein said controller is further adapted to identify any redundant prefetch and fetch requests from among the at least one prefetch request, the other prefetch requests, and the fetch requests.

7. The apparatus according to claim 1, wherein said controller is further adapted to limit how many prefetch requests are at least one of generated and issued, based upon predefined criteria.

8. The apparatus according to claim 1, wherein said controller is further adapted to constrain generation of the at least one prefetch request to only when a target of the at least one prefetch request has been previously stored in the second memory.

9. The apparatus according to claim 7, wherein said controller is further adapted to issue the at least one prefetch request only if a target of the at least one prefetch request has been previously stored in the second memory.

10. The apparatus according to claim 8, wherein said engine is further adapted to indicate whether a particular storage element has been previously stored in the second memory, based on a value associated with a particular bit in said table corresponding to the particular storage element.

11. An apparatus for fetching at least one of instructions and operand data from a second memory into a first memory of a computer system having at least one processor, the apparatus comprising:
   a table associated with the first memory, adapted to store a plurality of entries, wherein each entry is associated with a memory page that includes a plurality of storage elements in the second memory, and comprises information of prior access by the at least one processor to each of the plurality of storage elements;
   an engine, associated with the first memory adapted to search the table for a given entry associated with a given page that includes a target of a request, and to generate at least one prefetch request to fetch at least one storage element included in the given page from the second memory to the first memory based upon given information comprised in the given entry if the given entry is found, the request corresponding to a miss to the first memory from the at least one processor,
   a controller, associated with the first memory, adapted to analyze the at least one prefetch request with respect to other prefetch requests and fetch requests, if any, to determine which of the at least one prefetch request and the other prefetch requests are to be satisfied, prior to satisfying the at least one prefetch request, wherein the apparatus prefetches arbitrary lines within the given page based upon prior access information of the given page, wherein said controller is further adapted to limit how many prefetch requests are at least one of generated and issued, based upon predefined criteria, wherein said engine is further adapted to maintain a count of storage elements that are mapped to the given entry in the table and are currently present in the second memory.

12. The apparatus according to claim 11, wherein said engine is further adapted to increment the count for the given entry, upon the miss.

13. The apparatus according to claim 11, wherein said engine is further adapted to decrement the count for the given entry, when a given storage element included in the given entry is evicted from the given entry.

14. The apparatus according to claim 11, wherein said engine is further adapted to determine a confidence value for the at least one prefetch request.

15. The apparatus according to claim 14, wherein said engine is further adapted to report whether the at least one prefetch request was at least one of accessed, used and canceled.

16. The apparatus according to claim 15, wherein said controller is further adapted to constrain generation of the at least one prefetch request if a target of the at least one prefetch request is reported to have a prefetch use measure greater than a predefined threshold.

17. A method for fetching at least one of instructions and operand data from a second memory into a first memory of a computer system having at least one processor, comprising the steps of:

storing a plurality of entries in a table associated with the first memory, wherein each entry is associated with a memory page that includes a plurality of storage elements in the second memory, and comprises information of prior access by the at least one processor to each of the plurality of storage elements;

upon a miss to the first memory from the at least one processor based upon a request, searching the table for a given entry associated with a given page that includes a target of the request;

if the given entry is found, generating at least one prefetch request to fetch at least one storage element included in the given page from the second memory to the first memory, based upon given information comprised in the given entry, wherein the at least one prefetch request is generated by using only one prior access information of the given page; and prior to satisfying the at least one prefetch request, analyzing the at least one prefetch request with respect to other prefetch requests and fetch requests, if any, to determine which of the at least one prefetch request and the other prefetch requests are to be satisfied, wherein said analyzing step comprises the step of prioritizing an order of the at least one prefetch request, the other prefetch requests, and the fetch requests with respect to other operations being handled by the second memory.

18. The method according to claim 17, further comprising the step of satisfying at least one of the at least one prefetch request and the other prefetch requests, based on a result of said analyzing step.

19. The method according to claim 17, further comprising the steps of:

upon a hit to the first memory from the at least one processor based upon the request, searching the table for a particular entry corresponding to a particular page that includes the target of the request; and if the particular entry is found, updating particular information comprised in the particular entry with usage information relative to any particular storage elements that contain the target.

20. The method according to claim 17, further comprising the step of creating a new entry for the given page, if the given entry is not found.

21. The method according to claim 20, wherein said creating step comprising the step of flagging any given storage elements in the given page that contain the target.

22. The method according to claim 21, wherein said flagging step comprises the step of setting a bit corresponding to each of the given storage elements to a predefined value.

23. The method according to claim 17, wherein said analyzing step comprises the step of identifying any redundant prefetch and fetch requests from among the at least one prefetch request, the other prefetch requests, and the fetch requests.

24. The method according to claim 17, wherein said generating step further comprises the step of limiting how many prefetch requests are at least one of generated and issued, based upon predefined criteria.

25. The method according to claim 24, wherein said limiting step comprises the step of constraining said generating step to generate the at least one prefetch request only if a target of the at least one prefetch request has been previously stored in the second memory.

26. The method according to claim 24, wherein said limiting step comprises the step of issuing the at least one prefetch request only if a target of the at least one prefetch request has been previously stored in the second memory.

27. The method according to claim 25, further comprising the step of indicating whether a particular storage element has been previously stored in the second memory, based on a value associated with a particular bit in the table corresponding to the particular storage element.

28. A method for fetching at least one of instructions and operand data from a second memory into a first memory of a computer system having at least one processor, comprising the steps of:

storing a plurality of entries in a table associated with the first memory, wherein each entry is associated with a memory page that includes a plurality of storage elements in the second memory, and comprises information of prior access by the at least one processor to each of the plurality of storage elements;

upon a miss to the first memory from the at least one processor based upon a request, searching the table for a given entry associated with a given page that includes a target of the request;

if the given entry is found, generating at least one prefetch request to fetch at least one storage element included in the given page from the second memory to the first memory, based upon given information comprised in the given entry, wherein the at least one prefetch request is generated by using only one prior access information of the given page; and prior to satisfying the at least one prefetch request, analyzing the at least one prefetch request with respect to other prefetch requests and fetch requests, if any, to determine which of the at least one prefetch request and the other prefetch requests are to be satisfied, wherein said generating step further comprises the step of limiting how many prefetch requests are at least one of generated and issued, based upon predefined criteria, wherein said limiting step comprises the step of maintaining a count of storage elements that are mapped to the given entry in the table and are currently present in the second memory.

29. The method according to claim 28, further comprising the step of incrementing the count for the given entry, upon the miss.

30. The method according to claim 28, further comprising the step of decrementing the count for the given entry, when a given storage element included in the given entry is evicted from the given entry.

31. The method according to claim 28, further comprising the step of determining a confidence value for the at least one prefetch request.

32. The method according to claim 31, wherein said determining step comprises the step of reporting whether the at least one prefetch request was at least one of accessed, used and canceled.

33. The method according to claim 32, wherein said limiting step comprises the step of constraining said generating step to generate the at least one prefetch request only if a target of the at least one prefetch request is reported to have a prefetch use measure greater than a predefined threshold.

34. A program storage device readable by machine, tangibly embodying a program of instructions executable by the machine to perform method steps for fetching at least one of instructions and operand data from a second memory into a first memory of a computer system having at least one processor, said method steps comprising:

storing a plurality of entries in a table associated with the first memory, wherein each entry is associated with a memory page that includes a plurality of storage elements in the second memory, and comprises information of prior access by the at least one processor to each of the plurality of storage elements;

upon a miss to the first memory from the at least one processor based upon a request, searching the table for a given entry associated with a given page that includes a target of the request;

if the given entry is found, generating at least one prefetch request to fetch at least one storage element included in the given page from the second memory to the first memory, based upon given information comprised in the given entry, wherein the at least one prefetch request is generated by using only one prior access information of the given page; and prior to satisfying the at least one prefetch request, analyzing the at least one prefetch request with respect to other prefetch requests and fetch requests, if any, to determine which of the at least one prefetch request and the other prefetch requests are to be satisfied, wherein said analyzing step comprises the step of prioritizing an order of the at least one prefetch request, the other prefetch requests, and the fetch requests with respect to other operations being handled by the second memory.

* * * * *